J. Smith,
Sharpening Reciprocating Saws.

Nº 18,415.  Patented Oct. 13, 1857.

UNITED STATES PATENT OFFICE.

JONATHAN SMITH, OF AGAWAM, MASSACHUSETTS.

SAW-FILER.

Specification of Letters Patent No. 18,415, dated October 13, 1857.

*To all whom it may concern:*

Be it known that I, JONATHAN SMITH, of Agawam, in the county of Hampden and State of Massachusetts, have invented a new and useful Apparatus for Filing the Teeth of Circular Saws; and I do hereby declare the following to be a full and particular description thereof, referring to the accompanying drawing, in which—

Figure 2:
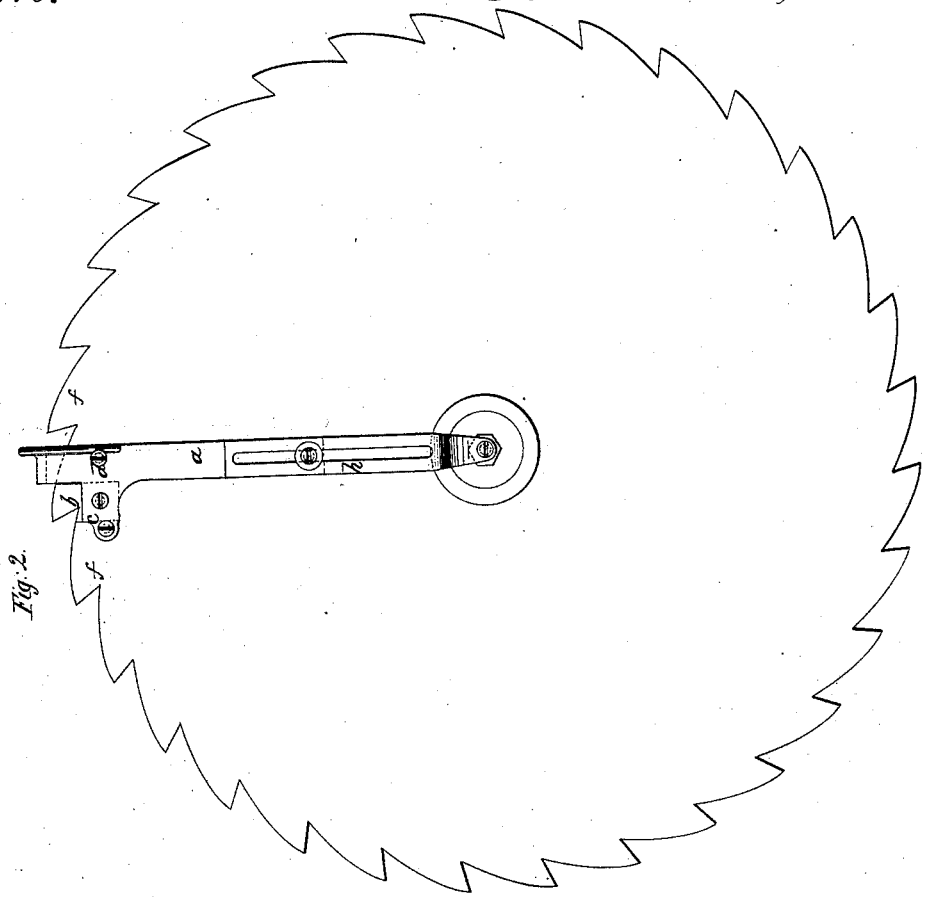
Figure 1:
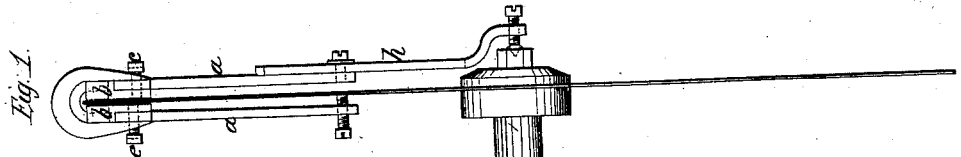
Figure 3:
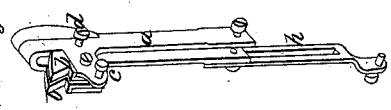

Figure 1, is a side elevation of one side of the apparatus affixed. Fig. 2, is a front elevation. Fig. 3, is the opposite side of the apparatus in perspective.

My invention is for the purpose of guiding and directing the operation of filing circular saws so as to perform the same accurately and preserve the circular figure of the saw while giving to each tooth the proper form and bevel and sharpening the same by the operation of hand filing.

Heretofore it has been found impossible to insure an exact form and bevel to a circular saw and so to file it by hand as to counteract the special tendencies thereof to run by filing it so as to draw correctly and perfectly and it required the most skilful workmen to file with tolerable accuracy which could only be done by long experience. With my apparatus any common operative can file a saw perfectly with the assurance that the greatest accuracy of form will be maintained.

The construction is as follows: I form a U shaped piece of metal $a$ the legs of which fit over the saw as seen in Figs. 1 and 2. Near the bend of this piece $a$ two pieces of case hardened steel $b$ are affixed to it one on each side and these pieces are made to the exact form the tooth is to be filed to as clearly represented and seen in Fig. 1, which represents one common form of tooth and the hardened steel " gigs " $b$ adapted thereto. These " gigs " as similar hardened steel patterns are called in other works for filing to, are so hard as not to be injured by the file and when in proper position serve to guide the operation of the file. The bow $a$ has two set screws $c$ $d$ on one side and one $e$ on the other as clearly seen in the figures, by which it is obvious it can be set upon the saw at any cross angle or straight across as desired by which the face of each tooth $f$ can be filed so as to draw either way in cutting, or be made straight across without any draw.

Near the end of each of the legs of the bow $a$ (which do not extend in to the center of the saw,) there is a set screw and upon either can be affixed an extension arm $h$ having a long slit in it for regulating the length of the radial arm. At the inner end of this arm $h$ there is a center screw which fits into the center countersink in the end of the saw arbor and insures the distance of the " gigs " from the center of the arbor without regard to its bearings by this guide, and set, the " gigs " can be swept all around the circle and afford a perfect guide and regulator, so that any inexperienced operative can file a circular saw therewith with accuracy.

Having thus fully described my new apparatus for a saw set what I claim as my invention, and for which I desire to secure Letters Patent is:

The combination and arrangements of the parts herein described consisting of the " gigs " regulating set and center guide in the manner and for the purposes specified.

JONATHAN SMITH.

Witnesses:
W. H. STANSBURY,
THOS. J. WELLS.